June 27, 1967     E. M. JONES     3,328,591
PHOTOELECTRIC SHAFT ANGLE ENCODER AND OPTICAL SYSTEM THEREFOR
Filed March 19, 1964     7 Sheets-Sheet 1
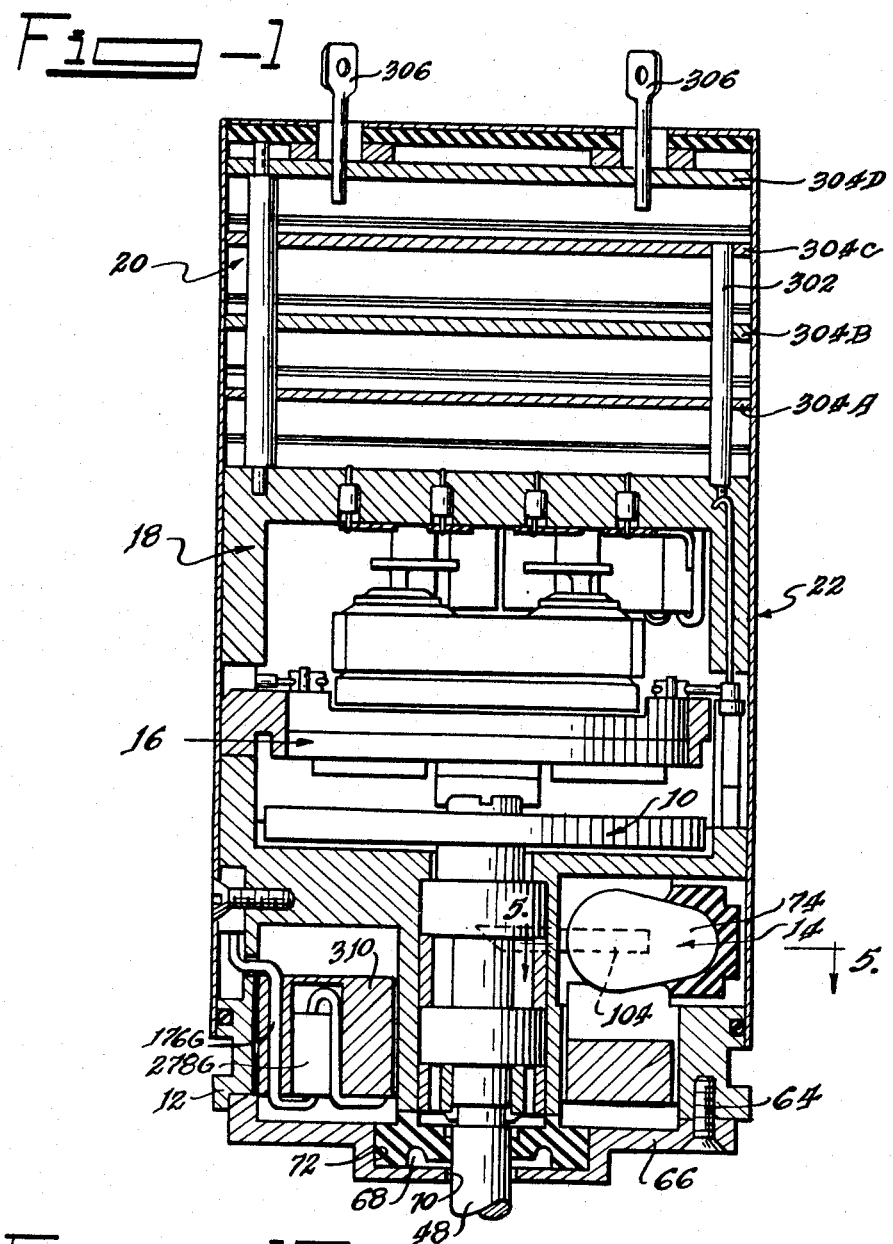
Inventor
By EDWARD M. Jones
Stone, Nierman
Burmeister & Zummer
Attorneys

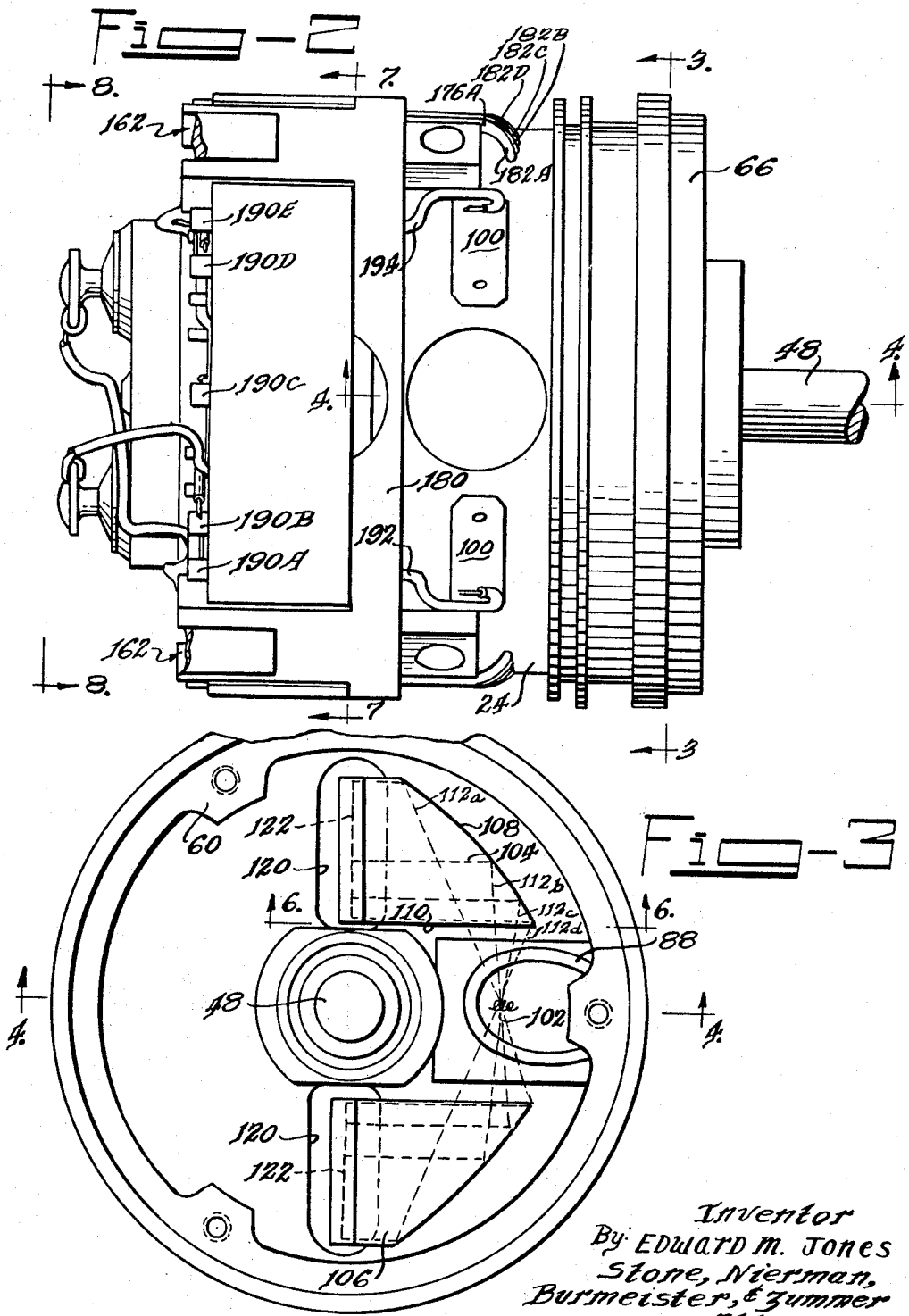

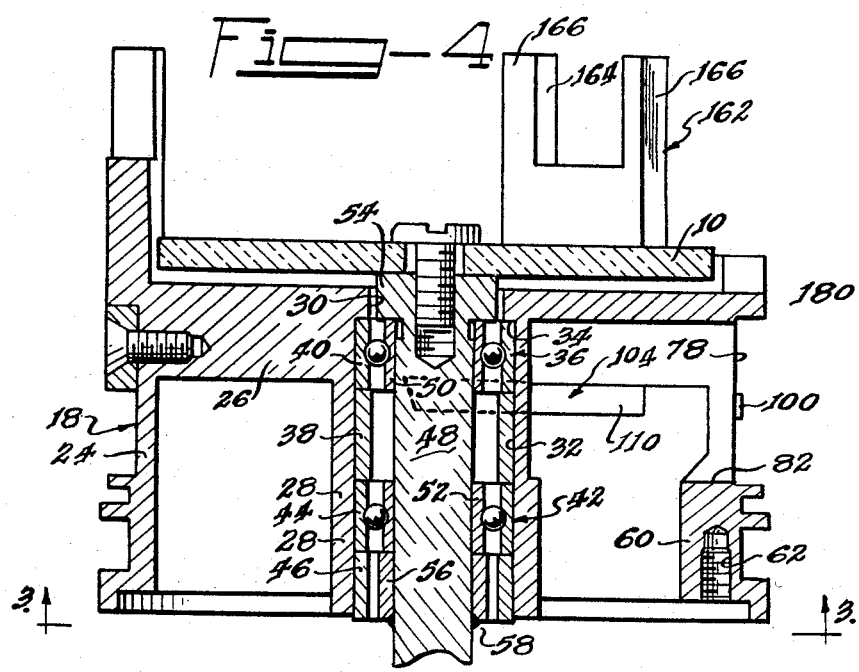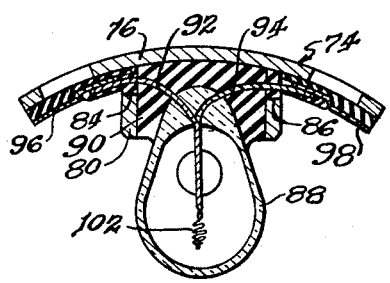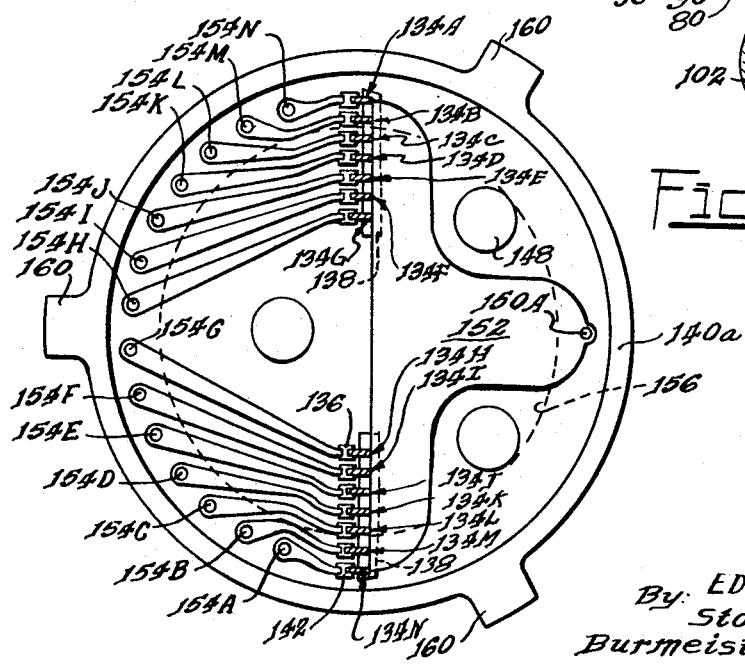

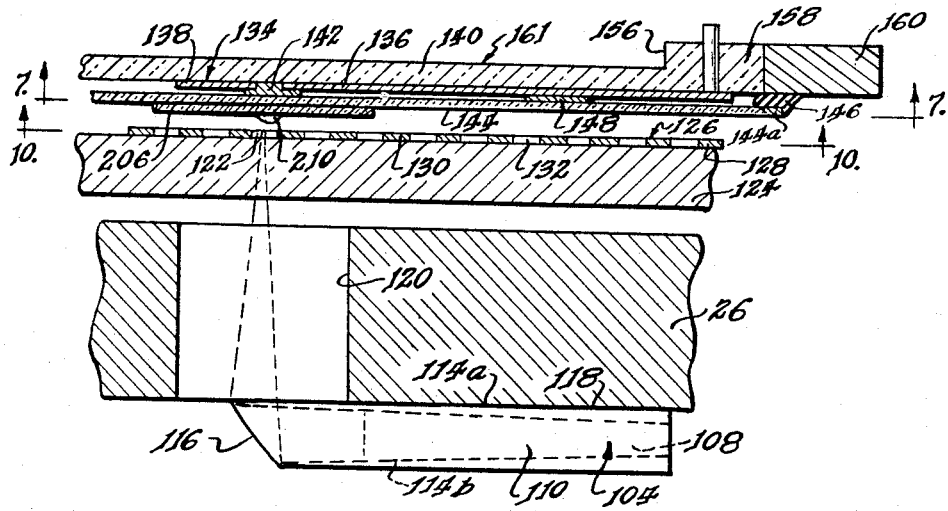
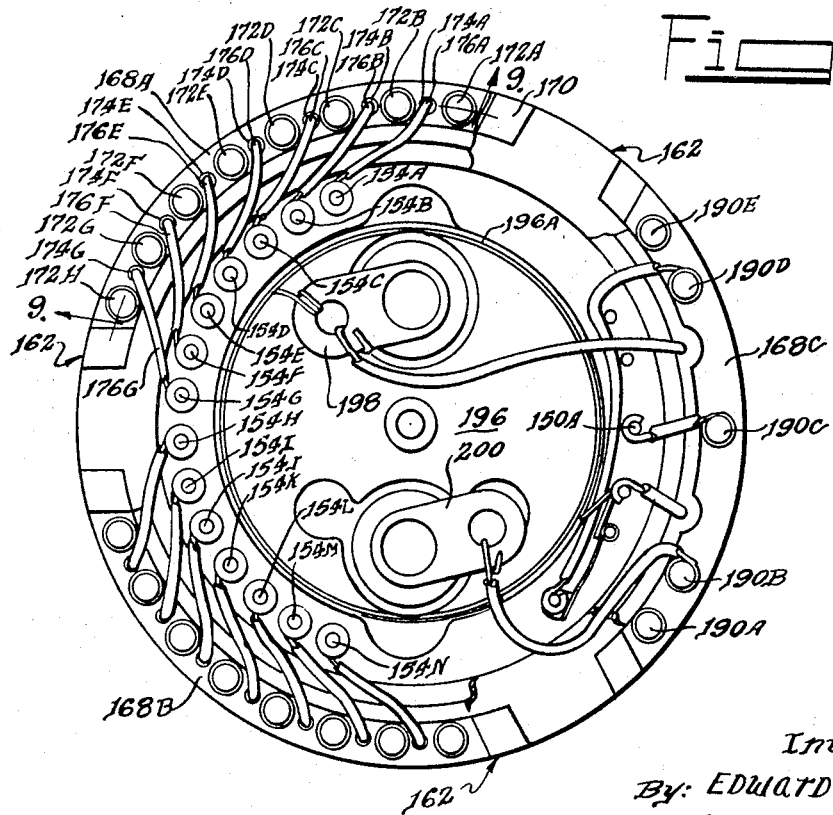

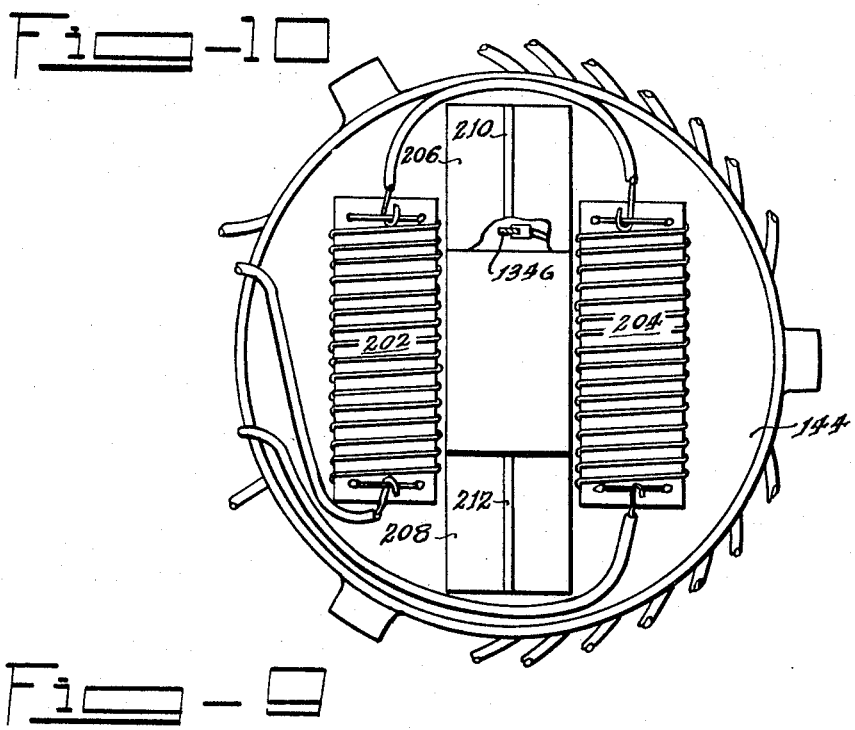
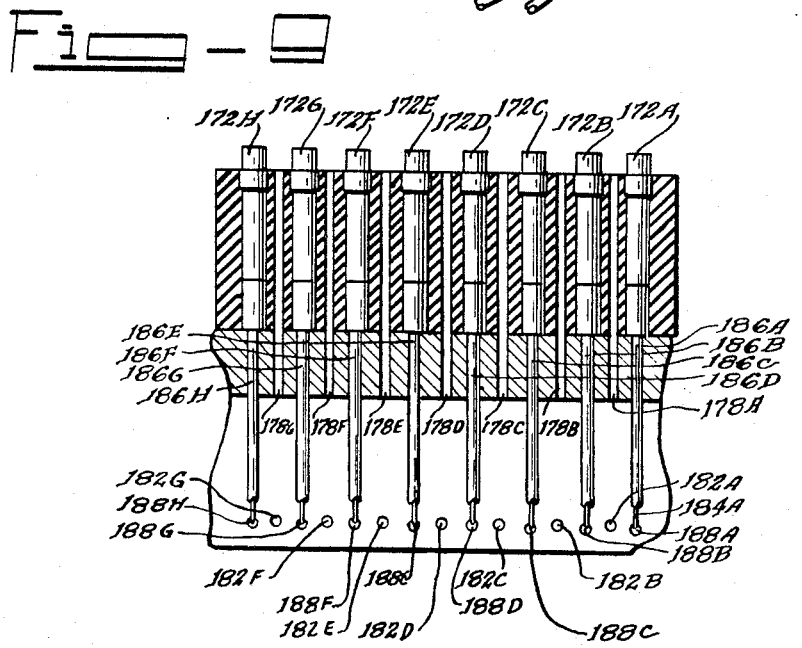

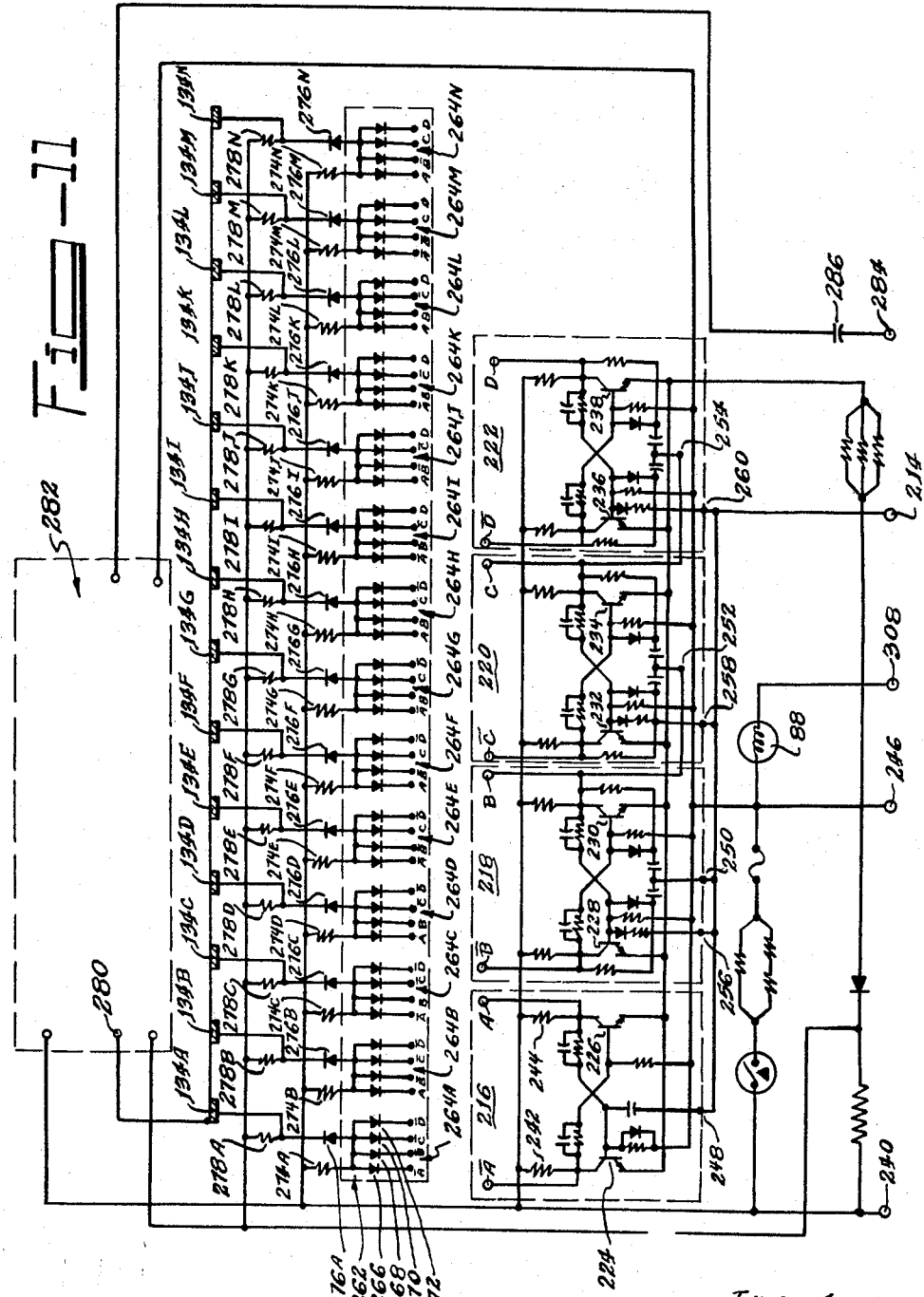

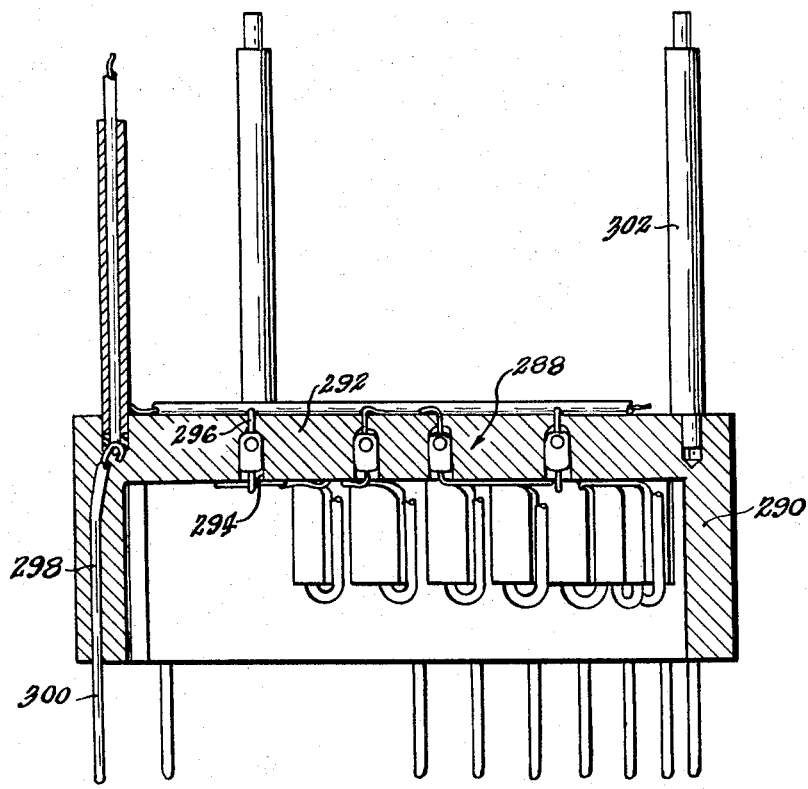

United States Patent Office 3,328,591
Patented June 27, 1967

3,328,591
PHOTOELECTRIC SHAFT ANGLE ENCODER AND OPTICAL SYSTEM THEREFOR
Edward M. Jones, Cincinnati, Ohio, assignor to D. H. Baldwin Company, Cincinnati, Ohio, a corporation of Ohio
Filed Mar. 19, 1964, Ser. No. 353,185
8 Claims. (Cl. 250—219)

The present invention relates generally to photoelectric shaft angle position encoders and includes photoelectric shaft angle analog to digital encoders as well as photoelectric tone generators. In particular, the present invention relates to an optical system particularly useful in photoelectric shaft angle encoders.

Generally, an optical encoder employs a code disc mounted to rotate on a shaft, and the analog information to be encoded is impressed upon the rotatable shaft. The code disc is provided with one or more annular tracks of opaque and transparent segments coaxially disposed about the center of the code disc. A lamp is disposed adjacent to one side of the code disc, and a photocell is mounted confronting each of the tracks on the opposite side of the code disc. Such a device may be utilized as a tone generator by driving the shaft at a constant rate, whereby the periodic outputs from the photocell confronting each track of the code disc may be utilized to generate musical tones.

It is one of the objects of the present invention to provide a photoelectric encoder with a novel optical system facilitating construction of the encoder in smaller housings without the loss of resolution.

It is also an object of the present invention to provide an optical system for a photoelectric shaft position encoder which utilizes a larger proportion of the total light generated by the encoder light source in actuating the photocells of the encoder.

As the diameter of code discs has been reduced in order to decrease the size of the housing of the encoder of a given resolution, it has become increasingly difficult to mount a photocell confronting each track of a plurality of tracks on the code disc and to avoid the presence of light on one of the photocells from affecting adjacent photocells. It is therefore a further object of the present invention to provide a novel photoelectric encoder construction which increases the space available for mounting photocells and minimizes the electrical output in one channel resulting from light impinging on the photocell of another channel.

In accordance with the present invention, the photocells are disposed in two groups or assemblies mounted on opposite sides of the shaft axis in a common line which is both normal to the shaft axis and intersects the shaft axis. A light source is employed which utilizes a single lamp which has a filament disposed on an axis normal to the shaft axis and normal to the plane of the photocells. Two light reflecting members are disposed on opposite sides of the lamp to collect and bend the light rays from the lamp to impinge upon the photocells of the encoder. The code disc of the encoder is mounted on the shaft and disposed between the light reflecting members and the two assemblies of photocells.

These and further objects of the present invention will become readily apparent to those skilled in the art from a further consideration of this specification, particularly when viewed in light of the drawings in which:

FIGURE 1 is an axial sectional view of an analog to digital encoder constructed according to the teachings of the present invention, some details having been omitted for clarity;

FIGURE 2 is an elevational view of the photocell assembly and housing of the encoder illustrated in FIGURE 1, the cover having been removed;

FIGURE 3 is an end elevational view taken along the line 3—3 of FIGURE 2 or the line 3—3 of FIGURE 4, the end plate having been removed for clarity;

FIGURE 4 is a fragmentary sectional view of the encoder taken along the line 4—4 of FIGURE 3 or the line 4—4 of FIGURE 2;

FIGURE 5 is a sectional view of the lamp assembly for the encoder taken along the line 5—5 of FIGURE 1;

FIGURE 6 is a sectional view taken along the line 6—6 of FIGURE 3;

FIGURE 7 is a fragmentary sectional view taken along the line 7—7 of FIGURE 6 or the line 7—7 of FIGURE 2;

FIGURE 8 is a plan view of the portion of the encoder illustrated in FIGURE 2 taken along the line 8—8 of FIGURE 2;

FIGURE 9 is a fragmentary sectional view taken along the line 9—9 of FIGURE 8;

FIGURE 10 is a plan view taken along the line 10—10 of FIGURE 6;

FIGURE 11 is a schematic electrical circuit diagram of the optical encoder of FIGURES 1 through 10;

FIGURE 12 is a curve showing the input interrogating pulse train for the encoder; and FIGURE 13 is a sectional view of the diode matrix board assembly in greater detail than illustrated in FIGURE 1.

As illustrated in FIGURE 1, the analog to digital encoder has a code disc 10 mounted on a housing 12 which also mounts a lamp and optical system 14. A photocell assembly 16 is mounted on the housing 12 on the side of the code disc 10 opposite the lamp and optical system 14, and an electrical interrogation means 18 is mounted on the remote side of a photocell assembly 16 from the code disc 10. The encoder is designed to operate from an interrogating pulse train which is received as an input and which will be more thoroughly described hereinafter, and an electronics package 20 is mounted on the interrogation means for the purpose of controlling the interrogation means in response to the input interrogating pulse train and for the purpose of amplifying the signal from the photocell assembly 16 to a useable level. The entire assembly from the housing 12 including the lamp and optical system 14, the photocell assembly 16, the interrogation means 18, and the electronics package 20 are disposed within a cylindrical cover 22 which is mounted on the housing 12. It is to be noted that FIGURE 1 illustrates the encoder in somewhat simplified form for purposes of clarity, and that certain details not shown in FIGURE 1 are presented hereafter and described with reference to other figures.

FIGURES 2 through 4 illustrate the housing construction in greater detail than set forth in FIGURE 1. This housing 12 has a cylindrical shell 24 and a wall 26 which extends across the shell normal to the axis thereof. The wall 26 is provided with a cylindrical sleeve 28 which extends coaxially within the shell 24 about the axis thereof and is aligned with and communicates with a circular opening 30 in the wall 26 located on the axis of the shell 24. The opening 30 and sleeve 28 form a cylindrical channel 32 which has a shoulder 34 adjacent to the opening 30. A first cylindrical ball bearing assembly 36 is disposed within the channel 32 and mounted in abutment with the shoulder 34. A cylindrical spacer having an outer diameter approximately equal to the diameter of the channel 32 abuts the outer race 40 of the ball bearing assembly 36 and is secured in the bore 32 of the sleeve 28 to secure the ball bearing assembly 36 in position. A second ball bearing assembly 42 has an outer race 44 disposed within the sleeve 28 in abutment with the end of the spacer 38 opposite the ball bearing assembly 36, and a second spacer 46 cylindrical in form mounted on the interior surface of the channel 32 on the side of the outer race 44 opposite the spacer 38 secures the ball bearing assembly 42 firmly in position.

A shaft 48 extends through and is mounted on the inner race 50 of the ball bearing assembly 36 and the inner race 52 of the ball bearing assembly 42. The shaft 48 has a head 54 of greater diameter than other portions of the shaft 48, and the head 54 engages the confronting surface of the inner race 50 of the bearing assembly 36. The shaft 48 is slidable within the inner race 50 of the ball bearing assembly 36 and within the inner race 52 of the ball bearing assembly 42, but the shaft is secured on a spacer sleeve 56 which is coaxially disposed about the shaft 48 on the side of the ball bearing assembly 42 remote from the ball bearing assembly 36 by a ring 58 of cement. The sleeve 56 engages only the inner race 52 of the ball bearing assembly 42, and the head 54 engages only the inner race 50 of the ball beairng assembly 36. In assembling the ball bearing assemblies 36 and 42 on the shaft 48, a slight pressure forcing the inner races 50 and 52 toward each other is permanently established, for example two pounds per square inch. In this manner, the ball bearing assemblies 36 and 42 are preloaded to eliminate play in the bearings and to maintain rotation of the shaft 48 in precision alignment with the axis of the shell 24.

The shell 24 is provided with a plurality of inwardly extending protrusions 60, three in the particular construction described in this application, and the protrusions 60 are provided with threaded bores 62 which engage threaded screws 64 (FIGURE 1) which mount a cover plate 66 on the shell 24. The cover plate 66 has a recess 68 (FIGURE 1) extending from the interior surface thereof coaxially about the shaft 48 and a circular opening 70 extending about the shaft 48 to permit the shaft to rotatably extend to the exterior of the housing 12. A circular dust seal constructed of compliant material, such as plastic or rubber, designated 72, is disposed within the recess 68 and engages the confronting surface of the shaft 48 to seal the interior of the housing 12 from dust and dirt particles present in the ambient atmosphere.

The lamp and optical system 14 is also mounted within the shell 24 (FIGURE 1). FIGURES 2 and 4 illustrate the encoder with the lamp assembly removed, but FIGURE 1 illustrates the lamp assembly, designated 74, in position, and FIGURE 5 illustrates the details of the lamp assembly 74. The lamp assembly 74 has a curved plate 76. The plate 76 has a pair of parallel edges in the plane of FIGURE 5, and is curved to fit in a groove 78 which is disposed in the exterior surface of the shell 24 adjacent to the wall 26 and extends about the entire perimeter of the shell 24. An inwardly protruding circular collar 80 extends from the central portion of the plate 76 and has a diameter approximately equal to the diameter of a circular aperture 82 in the shell 24 disposed centrally within the groove 78. The collar 80 has a pair of small apertures 84 and 86 which extend therethrough on opposite sides thereof in the plane of the circular groove 78, and a lamp 88 is mounted in the collar 80 by means of an epoxy cement layer 90. The two terminal wires 92 and 94 extend through the apertures 84 and 86, respectively, and are anchored at their ends opposite the lamp 88 on electrical contact plates 96 and 98 disposed on the interior side of the plate 76. Each of the contact plates 96 and 98 abuts an electrical terminal 100 protruding from the surface of the shell 24 within the groove 78 and adjacent to the aperture 82. The contact terminals are electrically connected to a source of direct current, not illustrated. The lamp 88 is an incandescent lamp and has a filament 102 disposed approximately on the axis of the cylindrical collar 80. The position of the lamp 88 is maintained by virtue of the close fit between the collar 80 and the aperture 82 in the shell 24 and by abutment of the edges of the plate 76 against the edges of the groove 78 in the shell 24. In addition, the plate 76 is maintained in abutment with the surface of the groove 78 by the cover 22 which extends over the groove 78 as illustrated in FIGURE 1.

Light from the lamp 88 is focused on the code disc 16 by two mirrors or prisms designated 104 and 106.

FIGURES 3 and 6 best illustrate the optical system of the encoder. The prism 104 is illustrated in FIGURES 3, 4 and 6 as mounted on the lower surface of the wall 26, as by cement. It will be noted from FIGURE 3 that the prism 104 has a curved exterior convex surface 108 parallel to the axis of the shaft 48 and that this surface is remote from a flat surface 110 parallel to the axis of the shaft 48 and also parallel to the axis of the filament 102 of the lamp 88. The flat surface 110 immediately confronts the lamp 88, and the convex surface 108 is on the opposite side of the flat surface 110 from the lamp 88 so that light rays entering the prism 104 will enter through the flat surface 110 and be reflected from the curved light reflecting surface 108. FIGURE 3 illustrates the fact that the filament 102 may be considered to be a point source of light, and so considered, the light reflecting surface 108 reflects all rays designated 112a, 112b, 112c and 112d in the illustration, to a direction nearly parallel to the flat surface 110. All points on the surface 108 must be located on a curved surface to bend the light rays from the lamp generally parallel to the surface 110.

As illustrated in FIGURE 6, the prism 104 has a second convex surface 116 at the end opposite the convex surface 108 which is convex about an axis normal to the flat surface 110 and normal to the axis of convexity of the surface 108. Rays traveling parallel to the flat upper surface, designated 118 in FIGURE 6, are reflected from the convex surface 116 to pass through a slot 120 in the wall 26 to impinge upon the code disc 10. All light rays traveling roughly parallel to the surface 118 of the prism 104 are reflected by the convex surface 116 to focus on a point disposed in the plane of the upper surface of the code disc 10. For illustrative purposes, it is assumed that the ray 114b illustrated in FIGURE 6 enters the flat surface 110 of the prism 104 adjacent to the surface remote from the flat surface 118 and is reflected from a point on the convex surface 116 adjacent to the flat surface remote from the surface 118 to focus on the point designated 122 in the plane of the upper surface of the code disc 10. Also, the ray 114a is illustrated as entering the prism 104 adjacent to the flat surface 118 and being reflected by the convex surface 116 to focus on the point 122.

The prism 106 is a mirror image of the prism 104, and hence two lines of light pass through the slots 120 located on opposite sides of the shaft 48 and are disposed in a line with the axis of the shaft 48. The two lines of light are represented by the focal line 122 in FIGURE 6 and are disposed in the plane of the upper surface of the code disc 10.

The code disc 10 has a circular flat glass plate 124 which is provided with a coating 126 on its surface remote from the wall 26, and this coating 126 is provided with a plurality of tracks, one of which is illustrated in FIGURE 6 and designated 128, which consists of alternating opaque sectors 130 and transparent sectors 132. The tracks 128 are coaxial about the shaft 48.

The focal lines 122 are disposed on a diameter of the code disc 10, and the photocell assembly 16 positioned adjacent to the code disc 10 as two rows of photocells 134 confronting the code disc 10 and aligned with the two focal axes 122. FIGURE 6 illustrates one of the photocells 134 confronting the track 126, and an identical photocell confronts each of the other tracks of the code disc. In the particular construction described throughout this specification, the encoder disc 10 has fourteen tracks and fourteen photocells, thirteen of the tracks having alternate transparent and opaque sectors as illustrated, and the fourteenth track being nearest to the axis of the shaft 48 and being entirely transparent. The inner most transparent track is for the purpose of providing a reference signal indicating the brilliance of the light source in accordance with the teachings of Patent No. 3,023,406 of Edward M. Jones, issued Feb. 27, 1962. Each of the photocells 134 has a pair of electrically conducting electrodes 136 and 138 mounted on a base plate 140 of electrically insulating material. A mass 142 of semi-conductive material is disposed between the electrodes 136 and 138, and a transparent cover plate 144 which is circular in form is sealed about its metal perimeter 144a by a layer of solder 146. Three circular wafers 148 space the cover plate 144 from the electrodes 136, 138. Both the cover plate 144 and the base 140 are constructed of glass, the base because of the electrically insulating properties of glass and the cover plate because of its transparency.

As best illustrated in FIGURE 7, one of the electrodes 138 of each of the cells located on one side of the axis 48 of the encoder, designated 134A, 134B, 134C, 134D, 134E, 134F, and 134G, is in the form of a common strip of electrically conducting film disposed upon the base 140. In like manner, the photocells disposed upon the opposite side of the shaft 48, designated 134H, 134I, 134J, 134K, 134L, 134M, and 134N, have a common electrically conducting film in the form of a strip for the electrode 138. The two strips 138 of electrically conducting material are electrically connected to a pin 150A disposed adjacent to the perimeter of the base plate 140 by an electrically conducting film 152 disposed on the base plate 140 and partially over the two electrically conducting strips 138. The other electrode 136 of each of the photocells is connected to an individual terminal pin located adjacent to the perimeter of the base plate 140, the cell 134A being connected to terminal pin 154A, cell 134B being connected to terminal pin 154B, and cells 134C, 134D, 134E, 134F, 134G, 134H, 134I, 134J, 134K, 134L, 134M, and 134N, having their other electrode 136 connected to terminal pins 154C, 154D, 154E, 154F, 154G, 154H, 154I, 154J, 154K, 154L, 154M, and 154N, respectively. The base plate 140 has a recess 156 on its side opposite the photocells, and the pins extend through the circular flange 158 formed by the recess and protrude therefrom to permit electrical connection to the electrodes 136 and 138 of the photocells.

The base plate 140 has a metal perimeter 140a and three equally spaced tabs 160 extend outwardly from the perimeter 140a of the base plate 140 for mounting the base plate and photocell assembly on the housing 12. The housing 12 has three forks 162 which extend upwardly from the shell 24 and are equally spaced about the perimeter of the wall 26. The forks 162 are normal to the wall 26 and are provided with rectangular indentations 164 forming a pair of parallel legs 166. The photocell assembly 16 is positioned with the tabs 160 thereof disposed within the indentations 164 of the forks 162. The distance between the legs 166 of each fork exceeds the width of the tabs 160, thereby permitting the photocell assembly to be displaced rotationally a short distance to permit alignment of the photocell assembly with the focal axis 122 of the optical system. When alignment has been achieved, the photocell assembly is cemented in place on the forks 162 of the housing 12.

As best illustrated in FIGURES 2, 8, and 9, arcuate connectors 168A, 168B, and 168C are disposed between the forks 162 and form with the forks 162, a cylindrical surface. The arcuate connectors 168A, 168B, and 168C have a body 170 of electrically insulating material, and a plurality of electrically conducting sockets 172 are spaced along the perimeter of each of the arcuate connectors 168. The arcuate connector 168A has sockets 172A, 172B, 172C, 172D, 172E, 172F, 172G, and 172H and a cylindrical channel is disposed between the adjacent sockets and designated 174A, 174B, 174C, 174D, 174E, 174F, and 174G. Photocell terminal pin 154A is connected to an electrically conducting wire 176A having an electrically insulating coating which extends through the channel 174A and through a bore 178A in the outwardly extending flange 180 formed in the shell 24 of the housing 12 adjacent to the wall 26 to enter an aperture 182A which extends through the shell 24 for purposes which will be described hereinafter. In like manner, photocell pin 154B has a wire 176B which passes through the channel 174B in the flange 180 to enter an aperture 182B. In like manner, photocell treminal pins 154C, 154D, 154E, 154F, and 154G, are electrically connected to wires 176C, 176D, 176E, 176F, and 176G which pass through channels 174C, 174D, 174E, 174F, and 174G, respectively, in the arcuate connector 168A and also through channels 178C, 178D, 178E, 178F, and 178G, in the flange 180. These wires in turn pass through apertures 182C, 182D, 182E, 182F, and 182G, respectively, in the shell 24.

In like manner, the socket 172A has a wire 184A which extends through a channel 186A in the flange 180 aligned with the socket 172, and the wire 184A passes through a bore 188A in the shell 24. Likewise, the socket 172B, 172C, 172D, 172E, 172F, 172G, and 172H have wires which pass through channels 186B, 186C, 186D, 186E, 186F, 186G, and 186H in the flange 180 and enter through bores 188B, 188C, 188D, 188E, 188F, 188G, and 188H in the shell 24. The bores 182 and 188 are disposed in a common line, and the channels 186 and 178 are disposed in a common arcuate plane.

The arcuate connector 168B is identical to the arcuate connector 168A and will not be further described. The arcuate connector 168C is also constructed of electrically insulating material and has sockets 190A, 190B, 190C, 190D, and 190E extending therethrough. The socket 190A is connected to a wire 192 which is connected to one of the spring contacts 100 for the lamp assembly. The socket 190E is connected to a wire 194 which is connected to the other spring contact 100 of the lamp assembly, and the socket 190E is also interconnected with the socket 190D and forms a common or ground terminal for the encoder. The pin 150A of the photocell assembly is electrically connected to the socket 190C of the arcuate connector 168C and, as will be explained hereinafter, is electrically connected to the electronics package 20.

A heater and thermostat assembly 196 is disposed in the recess 156 of the photocell assembly and has terminals 198 and 200. Also, as illustrated in FIGURE 10, a pair of heaters 202 and 204 are disposed on the surface of the cover glass 144 of the photocell assemblly 16 on opposite sides of the photocells 134. The two heaters 202 and 204 are connected in series and in parallel with the heater 196A. The purpose of the heaters 196A, 202, and 204 is to maintain the photoresistive cells 134 at a temperature within a narrow range.

The photocells 134 are constructed with masses 142 of photoconductive material and may be constructed in the manner described in the patent application of William B. Hugle et al., Ser. No. 791,400, filed Feb. 5, 1959, entitled "Photocells and Method of Manufacturing Photocells," now Patent No. 3,187,414. The photoconductive mass 142 may comprise cadmium sulfide, lead sulfide, lead selenide, zinc selenide, zinc sulfide, zinc telluride, cadmium telluride, germanium, silicon, and lead telluride, and in the particular embodiment of this invention described throughout this specification cadmium selenide is utilized for the photoconductive mass. The electrodes 136 and 138 for the photocells 134 may comprise gold, silver, chromium, or Inconel, for example.

FIGURE 10 also illustrates a first mask block 206 positioned over photocells 134A, 134B, 134C, 134D, 134E, 134F, and 134G, carrying a semi-cylindrical lens 210 cemented on the surface of the mask block 206 in alignment with the focal axis 122 (FIGURE 6) of the optical system confronting these photoconductive cells. In like manner, a second semi-cylindrical lens 212 has its flat surface cemented on the flat surface of a second mask block 208 in alignment with the focal axis 122 confronting the cells 134H, 134I, 134J, 134K, 134L, 134M, and 134N (FIGURE 7). In this manner, the image of the code disc 10 is focused on the sensitive areas of the photocells in accordance with the teachings of Patent No. 2,941,088 of W. H. Mahaney, entitled "Optical Encoder."

FIGURE 11 is a schematic circuit diagram illustrating the electrical circuits of the optical encoder described herein which are designed to respond to an input pulse train in the form illustrated in FIGURE 12. The input pulse train is impressed upon an input terminal 214 which is electrically connected to the input circuit of four flip-flops designated 216, 218, 220, and 222. The flip-flop 216 has two transistors 224 and 226 connected in a conventional transistor flip-flop circuit with output terminals designated $\overline{A}$ and A. In like manner, flip-flop 218 utilizes transistors 228 and 230 and has output terminals designated $\overline{B}$ and B. Also, flip-flop 220 has transistors 232 and 234 driving output terminals $\overline{C}$ and C. Also, flip-flop 222 utilizes transistors 236 and 238 to drive output terminals $\overline{D}$ and D. In each case, the collector of one of the transistors is connected to the output terminal and also to a positive source of potential through a voltage dropping resistor. For example, in flip-flop 216, the collector of transistor 224 is connected to the output terminal A and connected to a source of positive potential applied through a terminal 240 through a resistor 242. The transistor 226 has a collector connected to the output terminal $\overline{A}$ and to the terminal 240 through a resistor 244.

The input terminal of flip-flop 216 has been designated 248, the input terminal of flip-flop 218 has been designated 250, the input terminal of flip-flop 220 has been designated 252, and the input terminal of flip-flop 222 has been designated 254. The input terminals 248 and 250 of the flip-flops 216 and 218 are connected to the input terminal 214 and receive the pulse train illustrated in FIGURE 12. The input terminal 252 of flip-flop 220 is connected to the output terminal B of flip-flop 218, and the input terminal 254 of flip-flop 222 is connected to the output terminal C of flip-flop 220. Flip-flops 218, 220, and 222 have reset input terminals 256, 258, and 260, respectively, which are connected to the input terminal 214 and reset these flip-flops in response to the negative leading portion of the wave train of FIGURE 12. The flip-flop 216 is also reset to the same condition by the negative going initial pulse of the wave train, said reset or zero position causing transistors 224, 228, 232, and 236 to be cut off.

Flip-flops 216, 218, 220, and 222 form a four stage flip-flop counter. The positive going successive pulses of the input wave train illustrated in FIGURE 12 result in successive unique combinations of outputs on the output terminals $\overline{A}$, A, $\overline{B}$, B, $\overline{C}$, C, $\overline{D}$, D.

FIGURE 11 illustrates a switching matrix 262. The switching matrix 262 has fourteen sections designated 264A, 264B, 264C, 264D, 264E, 264F, 264G, 264H, 264I, 264J, 264K, 264L, 264M, and 264N. Each of these sections has four diodes designated 266, 268, 270, and 272, and these diodes have one terminal electrically interconnected and the other terminal connected to one of the outputs of one of the four flip-flops 216, 218, 220, and 222.

In the section 264A, the diode 266 has one of its terminals connected to the output terminal $\overline{A}$, the diode 268 has one of its terminals connected to the output $\overline{B}$, the diode 270 has one of its terminals connected to the output $\overline{C}$, and the diode 272 has one of its terminals connected to the output $\overline{D}$. In like manner, the diodes of the groups 264B, 264C, 264D, 264E, 264F, 264G, 264H, 264I, 264J, 264K, 264L, 264M, and 264N have their output terminals connected to the output terminals of the flip-flops 216, 218, 220, and 222 indicated on the drawing of FIGURE 11. The diodes are all biased to pass positive charges in the direction of the flip-flops, and the common connected terminals of the diodes are connected to the positive power source terminal 240 through a resistor designated 274A, 274B, 274C, 274D, 274E, 274F, 274G, 274H, 274I, 274J, 274K, 274L, 274M, or 274N. The interconnected diodes of each group are also electrically connected to one of the photocells of the photocell assembly through a diode biased to pass positive charges in the direction of the photocell, that is, group 264A is connected to photocell 134A in series with diode 276A, group 264B is connected to photocell 134B through diode 276B, and groups 264C, 264D, 264E, 264F, 264G, 264H, 264I, 264J, 264K, 264L, 264M, and 264N of diodes are connected to their respective photocells through diodes 276C, 276D, 276E, 276F, 276G, 276H, 276I, 276J, 276K, 276L, 276M, and 276N, respectively. In addition, each of the photocells is connected to a positive potential lower than that of terminal 240 through a balancing resistor, the separate balancing resistors being designated 278A, 278B, 278C, 278D, 278E, 278F, 278G, 278H, 278I, 278J, 278K, 278L, 278M, and 278N. These resistors are selected to produce the same photocell current under the same conditions of illumination in spite of differences in photocell characteristics. The common electrode of each of the photocells is connected to the input terminal 280 of an amplifier 282, and the output of the amplifier 282 is connected to the output terminal 284 through a capacitor 286.

The balancing resistors are located about the bearing structure in the shell 24 of the housing 12. FIGURE 1 illustrates one of the balancing resistors 278G mounted on a resistance mounting board 310 and electrically connected by means of the wire 176G to the photocell 134G. The opposite end of the resistor is connected to socket 172H, and the matrix 262 is plugged into the socket 172H, along with other sockets, to make electrical connection, as more clearly illustrated in FIGURES 1, 9, and 13.

FIGURE 13 illustrates the diode matrix 262 in its physical form which utilizes a cup 288 of electrically insulating material having a cylindrical outer wall 290 of the same diameter as the diameter of the shell 24 of the housing 12. The cup 288 has a flat base 292 which is provided with recesses 294 extending therein from the surface confined within the cylindrical wall 290, and each of the recesses 294 contains one of the diodes of the diode sections 264A through 264N. Each recess 294 is provided with a bore 296 which extends to the opposite side of the base 292 from the recess 294 and one of the pigtail terminals of each of the diodes extends through this bore 296 to be electrically connected in the circuit of the diode matrix 262 by printed circuit techniques. In all, there are seventy recesses 294 to contain the seventy diodes of the matrix 262. Further, the resistors 274A through 274N are mounted on the base 292 within the cylindrical wall 290 of the cup 288 and connected in the matrix circuit as shown in FIGURE 11.

The cylindrical wall 290 of the cup 288 is provided with a plurality of channels 298, and outwardly extending pins 300 are anchored in the channels 298. These pins 300 are aligned with the sockets 172 of the arcuate connectors 168A, 168B, and 168C (FIGURE 8). In this manner, electrical connection is achieved from the sockets to the electronics package 20. More specifically, the photocells 134 of the photocell assembly are connected by means of these pins 300 engaging the sockets 172 to the coupling diodes 276 of the diode matrix 262.

FIGURE 1 and FIGURE 13 illustrate a plurality of posts 302 which extend from the base 292 of the cup 288 away from the arcuate connectors 168A, 168B, and 168C. The posts 302 are utilized to mount four printed circuit boards, designated 304A, 304B, 304C, and 304D which contain the flip-flop circuits 216 and 218, the flip-flop circuits 220 and 222, the amplifier 282, and power resistors, respectively. Since these elements are otherwise conventional, they will not be further described. The terminals 240, 246, 214, and 284 are in the form of pins or lugs 306 which protrude from the end of the cover 22. A separate terminal 308 is provided to provide electrical energy for the lamp 88, as indicated in FIGURE 11.

The matrix switching circuit 262 impresses a positive potential of approximately 13 volts on the junction between the first diode 276 and the group of diodes 266, 268, 270 and 272 through the resistor 274. However, this potential is available for actuation of the photocell associated with the group of diodes only during periods when the output terminals from the associated flip-flops 216, 218, and 222 are at a high impedance relative to the return terminal 246. The output terminals of the flip-flops are connected so that only one photocell is subjected to this potential at a given time, thereby interrogating that photocell. In order to make certain that the photocell will not be interrogated at other times, the common electrode of the photocell is maintained at a potential of approximately 4.5 volts applied through the input of the amplifier 282, and the balancing resistors 278 also have their common terminal connected to this potential.

An optical encoder constructed in the manner set forth herein may be fabricated in an extremely small casing. In the construction of the encoder described throughout this specification, a unit having a resolution of 8,192 divisions (13 binary digits) has been provided in a casing with a diameter of approximately one inch. The electronics to provide a useful output in sequential form is also enclosed within the cover 22 of the encoder. Further, the electronic package 20 of the encoder may be simply removed for servicing by a plug-in connector which utilizes a minimum of space.

Those skilled in the art will readily devise other uses for the present invention and utilities not here set forth. Further, the present invention may be modified by those skilled in the art based upon the teachings here set forth. It is, therefore, intended that the scope of the present invention be not limited by the foregoing disclosure, but rather only by the appended claims.

The invention claimed is:

1. A photoelectric shaft position encoder comprising a housing, a shaft rotatably mounted on the housing, a code disc having a plurality of circular tracks coaxially disposed about the shaft, each of said tracks having a plurality of sectors with different ratios of transmitted light to incident light, a light source mounted on the housing on one side of the code disc, said light source producing two lines of light in the plane of the code disc and disposed on a common axis intersecting the axis of the shaft, a first group and a second group of photocells mounted on the housing on the side of the code disc opposite the light source confronting the code disc, the first group and second group of photocells being on opposite sides of the shaft and disposed on a common plane with the axis and the two lines of light from the source, every other track of the code disc confronting a photocell of the first group and every track between said tracks of the code disc confronting a photocell of the second group.

2. A photoelectric shaft position encoder comprising the combination of claim 1 wherein the light source comprises a lamp having an elongated filament; mounted on the housing on an axis normal to the common axis of the two lines of light and normal to the shaft, a first light reflector and a second light reflector mounted on opposite sides of the lamp in a plane parallel to the code disc and intersecting the lamp, said light reflectors directing light rays impinging thereon from the lamp generally parallel to the axis of the lamp and radially inward, a third light reflector mounted on the housing on the axis normally traversing the shaft normal to the axis of the lamp, said third reflector confronting the first reflector and bending light rays parallel to the axis of the lamp normally to the code disc, and a fourth light reflector mounted on the housing on the same axis as the third light reflector and confronting the second reflector, said fourth reflector bending light rays from the second reflector parallel to the axis of the lamp normally to the code disc.

3. A photoelectric shaft position encoder comprising the elements of claim 2 wherein the first and third light reflectors are surfaces of a first prism, and the second and fourth light reflectors are surfaces of a second prism.

4. A photoelectric shaft position encoder comprising a housing having a bearing structure, a shaft rotatably mounted within the bearing structure, a code disc mounted on the shaft normal to the axis thereof for rotation therewith at one end of the bearing structure, said code disc having a plurality of circular tracks disposed coaxially about the axis of the shaft, each of said tracks consisting of a plurality of opaque segments separated by transparent segments, a lamp mounted on the housing at one side of the bearing structure, a prism mounted on the housing at one side of the lamp, said prism having a first flat wall disposed parallel to a plane passing through the axis of the shaft and normal to the plane of the code disc, said flat wall confronting the lamp at one end of the prism for receiving light from the lamp, said end of the prism having a first curved inwardly concave light reflecting wall normal to the plane of the code disc, said first curved wall bending rays of light from the lamp generally parallel to the first flat wall; said prism having a second inwardly concave curved light reflecting surface normal to the plane of the flat wall thereof and disposed in the plane normal to the flat wall and passing through the shaft axis, said second inwardly concave curved light reflecting surface bending light rays emanating from the first curved surface to a direction generally parallel to the shaft, and a plurality of photocells mounted on the housing on the side of the code disc opposite the prism confronting said last defined line, said photocells confronting tracks of the code disc.

5. A photoelectric shaft position encoder comprising the combination of claim 4 wherein the angle between the bisector at each point on the first light reflecting surface and the first ray is greater than the critical angle, and the angle between the bisector and the first ray at each point on the second light reflecting surface is greater than the critical angle.

6. A photoelectric shaft position encoder comprising the combination of claim 4 wherein the housing has a circular plate provided with a central opening and a sleeve extending from the opening, the bearing structure being mounted within the sleeve and the code disc mounted on the side of the plate opposite the sleeve, the prism being mounted on the plate adjacent to the sleeve and the plate having an opening confronting the second light reflecting surface of the prism.

7. A photoelectric shaft position encoder comprising the combination of claim 4 wherein the lamp is disposed on an axis radial of the shaft and parallel to the flat wall of the prism, in combination with a second prism mounted on the housing on the side of the lamp opposite the first prism, said second prism being an image of the first prism, the flat wall of the second prism being parallel to the flat wall of the first prism and confronting the lamp, and the second light reflecting surface of the second prism being disposed on the same axis as the second light reflecting surface of the first prism, a second plurality of photocells mounted on the housing confronting the code disc on the side thereof opposite the second light reflecting surface of the second prism, said second plurality of photocells confronting every other track of the code disc and the first plurality of photocells confronting those tracks of the code disc therebetween.

8. A photoelectric shaft position encoder comprising the combination of claim 7 wherein the housing has a circular plate provided with a central opening and a sleeve extending from the opening, the bearing structure being mounted within the sleeve and the code disc mounted on the side of the plate opposite the sleeve, the prisms being mounted on the surface of the plate opposite the code disc and the plate having openings therein confronting the second light reflecting surface of each prism.

References Cited

UNITED STATES PATENTS

| | | | |
|---|---|---|---|
| 2,910,684 | 10/1959 | Jones | 250—219 |
| 3,096,444 | 7/1963 | Seward | 250—220 |
| 3,148,834 | 9/1964 | Boehnke | 250—227 |
| 3,196,279 | 7/1965 | Papelian | 250—231 |
| 3,234,394 | 2/1966 | Worden | 250—231 |
| 3,248,554 | 4/1966 | Wo Chen | 250—227 |

RALPH G. NILSON, *Primary Examiner.*

J. D. WALL, *Assistant Examiner.*